United States Patent [19]
Forster

[11] Patent Number: 6,048,179
[45] Date of Patent: Apr. 11, 2000

[54] MODULE WITH AN ELECTRIC GENERATOR AND A PUMP UNIT

[75] Inventor: Franz Forster, Karlstadt-Mühlbach, Germany

[73] Assignee: Linde Aktiengesellschaft, Germany

[21] Appl. No.: 09/124,314

[22] Filed: Jul. 29, 1998

[30] Foreign Application Priority Data

Jul. 30, 1997 [DE] Germany .......................... 197 32 891
Nov. 13, 1997 [DE] Germany .......................... 197 50 379

[51] Int. Cl.$^7$ ............................... F04B 1/26; F04B 17/00
[52] U.S. Cl. ........................................ 417/364; 417/222.1
[58] Field of Search ................................ 417/222.1, 269, 417/313, 364

[56] References Cited

U.S. PATENT DOCUMENTS

| | | | |
|---|---|---|---|
| 3,958,901 | 5/1976 | Drevet | 417/269 |
| 5,363,740 | 11/1994 | Coakley | 417/269 |

*Primary Examiner*—Thomas N. Moulis
*Attorney, Agent, or Firm*—Webb Ziesenheim Logsdon Orkin & Hanson, P.C.

[57] ABSTRACT

A module preferably to be used in a machine tool or a machine, in particular in a fork lift truck, has an electric generator and a pump unit, both of which can be powered by an internal combustion engine. The pump unit is located at least partly in an axial recess of the generator housing and is provided to cool the generator. To expand the range of potential applications of the module, the pump unit is a hydraulic pump adapted to supply at least one hydraulic system. The housing of the pump consists of the walls of the generator housing that form the recess and a pump cover that creates a fluid-tight closure for the recess of the generator housing. The pump cover has a suction connection that empties into the recess of the generator housing. At least one distributing valve is integrated at least partly into the pump cover and/or at least one distributing valve is attached to the pump cover. The hydraulic pump is preferably an axial piston pump employing the swash plate principle, and the pump cover is a control base receptacle of the axial piston pump.

20 Claims, 2 Drawing Sheets

MODULE WITH AN ELECTRIC GENERATOR AND A PUMP UNIT

BACKGROUND OF THE INVENTION

1. Field of the Invention

This invention relates to a module with an electric generator and a pump unit, both of which can be powered by an internal combustion engine, wherein the pump unit is at least partly located in an axial recess of the generator housing and is provided to cool the generator.

2. Background Information

A similar module of the prior art is described in EP 0 666 634 A1 and is used in motor vehicles. In such an application, the rotational movement of the crankshaft of the internal combustion engine is transmitted to an electric generator and to a pump unit. The generator produces electrical energy which is transmitted to an electric traction motor of the motor vehicle. The pump unit is a coolant pump which removes thermal energy from the generator. The generator housing has coolant passages in the vicinity of a stator coil of the generator. The passages are connected to a pressure connection and a suction connection of the coolant pump by tubes and/or hose lines.

The object of the invention is to make available a module of the type described above that has an expanded range of potential applications.

SUMMARY OF THE INVENTION

In the invention, this object can be accomplished if the pump unit is a hydraulic pump supplying at least one hydraulic system, wherein the pump housing includes the walls of the generator housing that form a recess, and a pump cover that creates a fluid-tight closure for the recess of the generator housing, wherein the pump cover has a suction connection that empties into the recess of the generator housing, and at least one distributing valve is integrated at least partly into the pump cover and/or at least one distributing valve is attached to the pump cover.

In the invention the coolant used for the generator is hydraulic fluid that is sucked in by the pump and flows through the interior of the recess. The thermal energy of the generator is removed by the hydraulic fluid flowing through the walls of the recess. It is thereby possible to reliably prevent overheating of the generator. The removal of the thermal energy is promoted because the walls of the recess of the generator housing and of the pump cover that closes the recess represent the housing for the pump. With this construction, the number of components required is reduced and thus the expense entailed in the fabrication and assembly of the module of the invention can also be reduced.

Various accessory units of a motor vehicle equipped with the module of the invention can be supplied with hydraulic fluid by the hydraulic pump, for example, the hydraulic power steering system and/or a lifting device for an industrial truck. The accessory actuator system is thereby advantageously integrated into the pump and thus into the module. A separate valve block is unnecessary. In addition to the elimination of the need for this valve block, which is generally made from a metal casting to hold the distributing valves, the hydraulic lines to the individual sections of the distributing valves can also be eliminated. The installation and assembly of these components and the installation of the threaded connectors etc. can also be eliminated. The number of potential sources of leaks in the system, as a whole, is drastically reduced.

The hydraulic pump of the module of the invention can theoretically employ any desired type of construction. In one embodiment of the invention, the hydraulic pump is an axial piston pump that employs the swash plate principle, and the pump cover is a control base receptacle of the axial piston pump. This type of pump is capable of transmitting large hydraulic power in spite of a small amount of space it occupies.

One particular advantage is that the suction-side piston port in the axial piston pump is in communication with a suction channel in the control base receptacle and empties inside the recess of the generator casing, whereby the mouths of the suction connection and of the suction channel located in the recess of the generator housing are at some distance from one another. By means of the suction connection on the control base receptacle, the at least approximately unpressurized fluid flows first into the interior of the recess of the generator housing. The fluid is sucked from the interior of this recess through the mouth of the suction channel which is as far as possible from the mouth of the suction connection. Consequently, the entire interior of the recess of the generator housing or of the pump housing is flushed and an effective cooling action is achieved.

In one embodiment of the invention, there is a connecting piece which transmits the rotation of a crankshaft of the internal combustion engine to a drive shaft of the pump unit. The pump unit is driven by the internal combustion engine through this connecting piece. In this case, it is advantageous if the connecting piece is provided with means for the compensation of radial and/or axial tolerances and/or of angular displacements. The rotation of the crankshaft of an internal combustion engine is beset with static and dynamic variations caused by manufacturing and operating tolerances. In this case, there are axial and radial displacements of the crankshaft axis as well as angular deviations. As a result of the presence of the connecting piece, it is possible to compensate for these deviations with respect to the input shaft of the pump unit. It is advantageous if the connecting piece has an intermediate shaft which is mounted with axial play on both ends, and is provided on each end with curved longitudinal toothing. Compensation for the tolerances and displacements that occur can be reliably achieved by means of this simple and economic intermediate shaft.

The generator may be an external-rotor generator. In the invention it is appropriate if a stator coil is fastened to a wall of the generator housing, the back side of which forms an inside wall of the recess of the generator housing. The fluid sucked in by the axial piston pump thus removes the heat from the stator coil through the wall of the generator housing. The thermal energy is thereby removed directly from the flow in the recess, i.e. the housing of the axial piston pump. No additional coolant channels in the generator housing are necessary.

The piston displacement of the axial piston pump may be adjustable, and at least one actuator cylinder may hold an actuator piston that is effectively connected to a pivoting swash plate of the axial piston pump and may be located in the control base receptacle. The piston displacement adjustment device may also be integrated into the control base receptacle.

In one configuration of the invention, the distributing valves integrated into the control base receptacle or attached to the control base receptacle can be actuated electrically or hydraulically, whereupon the installation of complex and expensive actuator mechanisms becomes unnecessary. In operation, these actuator mechanisms frequently represent a constant source of problems (noise, loose connections, readjustment requirements) as a result of unavoidable vibrations.

The pressure channel of the pump may be in communication with an amortization chamber which is integrated into the control base receptacle or attached to the control base receptacle. The displacement flow from the pump is smoothed by the action of the amortization chamber. The reduction of pulsations thereby achieved is also reflected in a reduction of the noise level. The distributing valve integrated into the axial piston pump of the module of the invention can be a piston slide valve and a seat valve, which retains the advantages described above.

Depending on the intended application, it is appropriate if there is at least one secondary valve located in a plane that is offset from the plane that contains the distributing valve. Depending on the intended application, this secondary valve can also be a distributing valve or can be another type of valve (pressure valve, flow control valve, etc.).

In an additional embodiment of the invention, connected upstream of the distributing valve that is integrated into the control base receptacle or attached to the control base receptacle is a priority valve for the priority supply of a secondary hydraulic system that is integrated into the control base receptacle or is attached to the control base receptacle. The priority valve can be used, for example, to preferentially supply the hydraulic power steering system of a vehicle equipped with the module of the invention. For safety reasons, the power steering system must always be supplied with the required flow of hydraulic fluid independently of the actuation of other systems.

If the axial piston pump is to be used as an LS variable capacity pump, it is advantageous if a demand flow regulator that determines the flow volume of the axial piston pump is integrated into the control base receptacle or is attached to the control base receptacle, whereby the input and output signals and the control signals of the demand flow regulator are guided in channels that are located in the control base receptacle. The module of the invention is particularly well suited for use in a machine or machine tool, in particular in a fork lift truck.

These and other advantages of the present invention will be clarified in the description of the preferred embodiments taken together with the attached figures in which like reference numeral represent like elements throughout.

DESCRIPTION OF THE PREFERRED EMBODIMENTS

Figure 1:
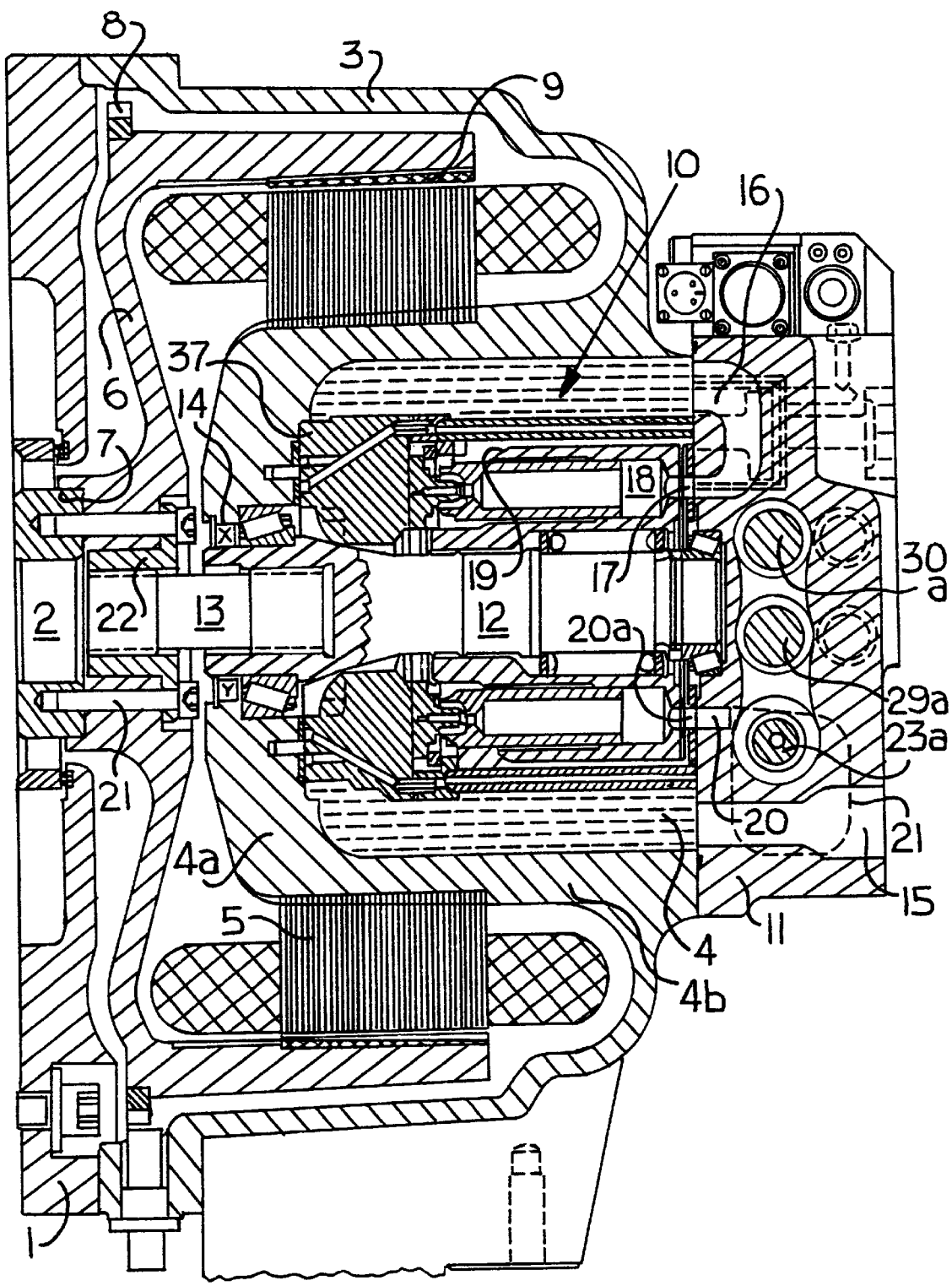
FIG. 1 is a longitudinal section through a module according to the present invention.

The module of the invention illustrated in FIG. 1 consists of an electric generator and a pump unit and is powered by an internal combustion engine which is illustrated only schematically. The engine in question is a conventional internal combustion engine of the type used in passenger cars or utility vehicles. This figure shows a portion of the housing 1 of the internal combustion engine and its crankshaft 2.

A generator housing 3 is fastened in a defined position to the housing part 1 of the internal combustion engine. The generator housing 3 is in the shape of a pot and has a central axial recess 4 which consists of walls 4a and 4b. A stator coil 5 of the generator is fastened in the vicinity of the axial extension of the recess 4, inside the generator housing 3.

A rotor 6, preferably made of cast metal material, of the generator is fastened to the crankshaft 2 of the internal combustion engine with fastening bolts 21 through a hardened steel sleeve 22. The external rotor 6 is centered on the crankshaft 2 by a molded centering boring 7, and simultaneously forms a flywheel for the internal combustion engine. A toothed starter rim 8 of the internal combustion engine is fastened to the rotor 6. Also, located on the rotor 6 are the permanent magnet poles 9 of the generator. There is an air gap between the permanent magnet poles 9 and the stator coil 5. The air gap is sized so that slight radial movements and angular displacements of the crankshaft 2, such as those that regularly occur during the operation of the internal combustion engine and in this particular arrangement, are transmitted directly to the rotor 6, and in no case result in a collision between the permanent magnet poles 9 and the stator coil 5.

Inside the recess 4 there is a pump unit 10 which, in this embodiment, is an adjustable hydraulic axial piston pump employing the swash plate principle. On the side facing away from the internal combustion engine, the generator housing 3 has a cover that provides a fluid-tight closing for the recess 4 and is a control base receptacle 11 of the axial piston pump that simultaneously represents the pump cover.

The wall 4a of the recess 4 in the generator housing 3 on the internal combustion engine side has an opening through which a drive shaft 12 of the pump unit 10 is connected to the rotor 6 by an intermediate shaft 13. The intermediate shaft 13 has curved longitudinal toothing on both ends for transmission to the pump unit 10 of the rotational motion of the rotor 6 which is connected to the crankshaft 2. This prevents the changes in the position of the crankshaft 2 caused by manufacturing tolerances and vibrations from being transmitted to the drive shaft 12 of the pump unit 10. The opening in the wall 4a is sealed with respect to the drive shaft 12 by an appropriate rotary shaft seal 14.

The control base receptacle 11 has a suction connection 15 which empties in the interior of the recess 4 that forms the housing of the axial piston pump, which recess 4 is filled with the hydraulic fluid sucked in by the axial piston pump. As a result of the arrangement of the pump unit 10 and the routing of the hydraulic fluid sucked in, the fluid flows through the walls 4a and 4b of the recess 4 of the generator housing 3. Consequently, the thermal energy from the stator coil 5 is removed through the walls 4a and 4b of the recess 4 with the flowing hydraulic fluid. It thereby becomes possible to reliably prevent overheating of the stator coil 5 and thus of the overall generator.

The control base receptacle 11, which functions as the pump cover and as the cover of the recess 4, is provided, in addition to the above-mentioned suction connection 15 and the suction channel 16 at some distance from it with a pressure channel 20 that forms the output of the pump. The pressure channel 20 is connected to a pressure nodule 20a.

Figure 2:
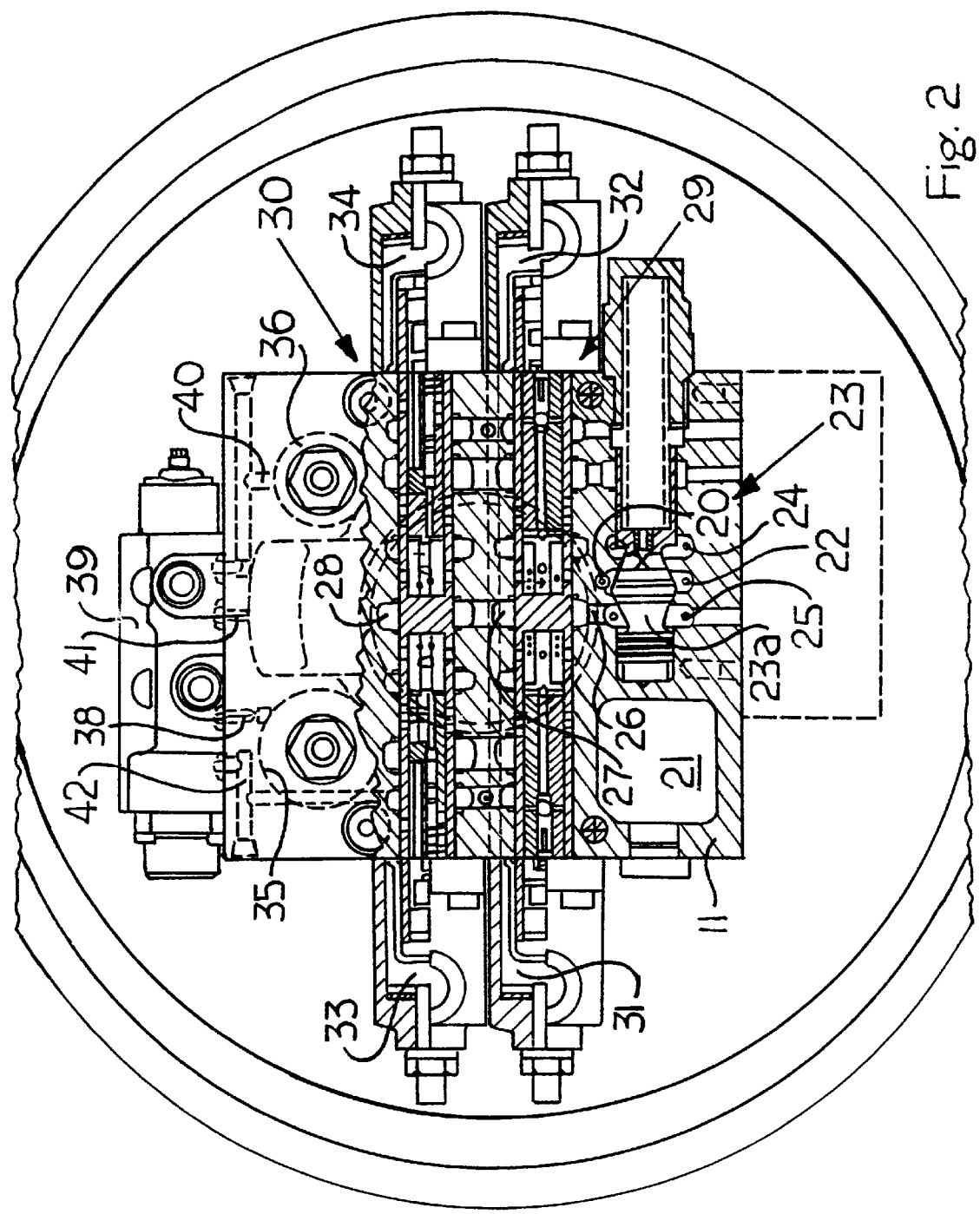
FIG. 2 is a partial section view of the module shown in FIG. 1 with the view from the pump side.

FIG. 2 shows the module of the invention as viewed from the pump side. An amortization chamber 21 integrated into the control base receptacle 11 is connected to the pressure nodule 20a, and in this embodiment is in communication with the pressure channel 20 by parallel switching. Through the presence of the amortization chamber 21, pulsations in the displacement flow of the pump are reduced. If an oil filter is to be located in the amortization chamber 21, the amortization chamber 4 must be interposed in a serial connection between the pressure nodule 20a and the pressure channel 20 so that all the hydraulic fluid flows through the hydraulic medium filter.

The pressure channel 20 empties into an annular groove 22, from which, by displacing a valve body 23a of a priority valve 23, it becomes possible to create a connection to an annular groove 24 and/or an annular groove 25. Connected to the annular groove 24 is a hydraulic system which is to be supplied with priority from the priority valve 23, e.g., the hydraulic power steering system of a machine such as a fork lift truck or similar device equipped with the module of the invention.

Connected to the annular groove 25 is an output channel 26 of the priority valve 23 which is connected by input-side annular grooves 27 and 28 of two distributing valves 29 and 30 located inside the control base receptacle 11 and are piston slide valves. Each distributing valve 20 and 30 has a valve slide 29a and 30a, respectively, each of which can be used to actuate a system. The distributing valves 29 and 30 in this embodiment can be actuated hydraulically. For this purpose, control chamber housings 31, 32, 33 and 34 are fastened to the side of the control base receptacle 11. The distributing valves 29 and 30 are each provided on the output side with two connections not shown in the accompanying drawings.

Between the valve slides 29a and 30a and the output-side connections of the distributing valves 29 and 30, relief valves, for example, can be located in a plane which is offset with respect to the plane in which the distributing valves 29 and 30 are located (not shown in the figures). Instead of relief valves of the type used in automotive applications, however, it is also possible to use one-way valves, e.g., to protect lifting cylinders or hydraulic jacks.

The piston displacement adjustment device of the axial piston pump is integrated into the control base receptacle, along with the distributing valves. In this case, the actuator cylinders 35 and 36 are located inside the control base receptacle 11. In each of the actuator cylinders 35 and 36 there is a respective actuator piston, each of which is effectively connected to a pivoting swash plate 37 of the axial piston pump.

The actuator piston located in the actuator cylinder 35 can be pressurized by the pressure in a channel 38 located in the control base receptacle 11. The channel 38 is provided for the routing of the output signal of a demand current regulator 39 fastened to the control base receptacle 11. On the input side, the demand current regulator 39 is connected to a channel 40 which is in communication with the pressure side of the axial piston pump and with the actuator cylinder 36. The demand current regulator 39 is also connected on the output side to a channel 41 that can be placed in communication with the unpressurized interior of the recess 4.

The demand current regulator is controlled as a function of the LS pressure transported in a channel 42 of the control base receptacle 11 (i.e., the maximum of all the system pressures connected to the pump) and the displacement pressure of the axial piston pump transported in the channel 40.

In addition to the distributing valves 29 and 30 that are integrated into the control base receptacle 11, distributing valves can be installed on or attached to the control base receptacle 11 (illustrated in dotted lines). The integrated distributing valves 29 and 30 are thereby provided as main valves, and the distributing valves placed on or attached to the control base receptacle 11 are secondary valves. The main valves are appropriately designed for a larger displacement flow than the secondary valves.

In the module of the invention, the hydraulic fluid is distributed and assigned to the various systems directly in or on the control base receptacle 11 of the axial piston pump, which thus represents a pump with integrated hydraulic fluid distribution and system actuation. A separate valve block to control the systems is unnecessary. The installation and assembly of hydraulic lines to the individual distributing valves is also unnecessary, and the danger of leaks is significantly reduced.

The disclosed embodiment is intended to be illustrative of the present invention and not restrictive thereof. It will be apparent to those of ordinary skill in the art that various modifications may be made to the present invention without departing from the spirit and scope thereof. Therefore, the scope of the present invention is defined by the appended claims and equivalents thereto.

I claim:

1. A module comprising:

an electric generator having a generator housing with an axial recess, said generator adapted to be powered by an internal combustion engine; and a pump unit adapted to be powered by the internal combustion engine, wherein said pump unit is located at least partly in said axial recess of said generator housing and is adapted to cool said generator, wherein said pump unit is a hydraulic pump adapted to supply at least one hydraulic system, wherein a housing of said pump includes walls of said generator housing that form said recess and a pump cover that creates a fluid-tight closure for said recess of the generator housing, wherein said pump cover has a suction connection that empties into said recess of said generator housing, and wherein at least one distributing valve is coupled to said pump cover.

2. The module as claimed in claim 1, wherein said hydraulic pump is an axial piston pump employing the swash plate principle, and said pump cover is a control base receptacle of said axial piston pump.

3. The module as claimed in claim 2, wherein a suction-side control slot of said axial piston pump is in communication with a suction channel in said control base receptacle which empties inside said recess of said generator housing, wherein openings of said suction connection and of said suction channel that are located in said recess of said generator housing are located at a distance from one another.

4. The module as claimed in claim 1, further including a connecting piece that is adapted to transmit the rotational motion of the crankshaft of the internal combustion engine to a drive shaft of said pump unit.

5. The module as claimed in claim 4, wherein said connecting piece is provided with means to compensate for radial and axial tolerances and angular displacements.

6. The module as claimed in claim 4, wherein said connecting piece includes an intermediate shaft that is mounted on both ends with axial play and is provided with a curved toothing on each end.

7. The module as claimed in claim 1, wherein said generator is an external rotor generator.

8. The module as claimed in claim 1, wherein a stator coil is fastened to one wall of said generator housing, and wherein a back side of said wall forms one inner side of said recess of the generator housing.

9. The module as claimed in claim 2, wherein a piston displacement of said axial piston pump is adjustable, and wherein in said control base receptacle there is at least one actuator cylinder that holds an actuator piston which is effectively connected to a pivoting swash plate of said axial piston pump.

10. The module as claimed in claim 1, wherein said distributing valve can be actuated electrically.

11. The module as claimed in claim 2, wherein a pressure channel of said axial piston pump is in communication with an amortization chamber which is coupled to said control base receptacle.

12. The module as claimed in claim 1, wherein said distributing valve is a piston slide valve.

13. The module as claimed in claim 1, further including at least one secondary valve located in a plane that is offset from the plane that contains said distributing valve.

14. The module as claimed in claims 1, wherein connected upstream of said distributing valve is a priority valve for the preferential supply of a secondary system, said priority valve coupled to said control base receptacle.

15. The module as claimed in claim 2, wherein a demand current regulator that determines the displacement volume of said axial piston pump is coupled to said control base receptacle, wherein input and output signals as well as control signals of said demand current regulator are transported in channels that are located in said control base receptacle.

16. The module as claimed in claim 1, wherein the internal combustion engine is in a fork lift truck.

17. The module as claimed in claim 1, wherein at least one said distributing valve is integrated at least partly into said pump cover.

18. The module as claimed in claim 1 wherein said distributing valve can be actuated hydraulically.

19. The module as claimed in claim 11, wherein said amortization chamber is integrated into said control base receptacle.

20. The module as claimed in claim 1 wherein said distributing valve is a seat valve.

* * * * *